Patented Apr. 13, 1926.

1,580,966

UNITED STATES PATENT OFFICE.

BENTON DALES AND WILLIAM S. CABLE, OF AKRON, OHIO, ASSIGNORS TO THE B. F. GOODRICH COMPANY, OF NEW YORK, N. Y., A CORPORATION OF NEW YORK.

METHOD OF MAKING MOLDED RUBBER ARTICLES, MOLD, AND LUBRICANT THEREFOR.

No Drawing. Application filed November 17, 1924. Serial No. 750,473.

*To all whom it may concern:*

Be it known that we, BENTON DALES and WILLIAM S. CABLE, citizens of the United States, residing at Akron, in the county of Summit and State of Ohio, have invented certain new and useful Methods of Making Molded Rubber Articles, Molds, and Lubricants Therefor, of which the following is a specification.

This invention relates to hollow rubber articles formed and vulcanized upon mandrels or cores, such as battery jars, and similar one-piece containers, and has for an object to provide an improved method of making rubber articles of this character which shall produce upon the vulcanized articles mandrel-formed surfaces to which sealing compounds normally employed in securing covers to containers will tightly and permanently adhere. A further object is to provide an improved mandrel-lubricant.

It has heretofore been the usual practice in the manufacture of battery jars and other one-piece containers to coat the mandrel with soap or water-glass prior to placing the rubber stock about the mandrel. These mandrel lubricants, so-called, prevent effectively the adhesion of the rubber to the mandrel during vulcanization but are objectionable in the manufacture of battery jars in that they leave on the vulcanized container a water-soluble film. This is objectionable for the reason that, after the battery has been charged and the cover sealed in place by means of a suitable sealing compound, the battery liquid seeps upwardly along and thru the water soluble film and loosens the sealing compound from the jar with the result that the jar leaks and slowly dissipates the liquid content of the battery.

This objectionable loosening of the cover sealing compound is overcome in accordance with the present invention by the employment of mandrel lubricants which are non-soluble in water and contain no water soluble materials. Not all substances which meet this condition, however, are satisfactory for this purpose. Oils, fats, fatty-acids, animal waxes, solid hydrocarbons like the paraffins, shellac and resins, while non-soluble in water, are of no value as mandrel lubricants, because they are absorbed by the hot rubber during vulcanization, and as a consequence the jar sticks to a greater or a lesser extent to the mandrel. We have discovered as a result of extended investigations that waxes of vegetable origin generally possess the essential properties of non-solubility in water and resistance to absorption in rubber at vulcanization temperatures. Montan wax, carnauba wax, candelilla wax and sugar cane wax are particularly satisfactory as mandrel lubricants, and may be employed with excellent results in the manufacture of battery jars.

In carrying out the present invention, about 5 parts by weight of Montan wax, for example, are dissolved in 100 parts by weight of benzol or gasoline, or other organic solvents or mixtures thereof. Both the wax and the solvent should be substantially free of water soluble materials. This solution is then spread on a clean mandrel and allowed to dry. The resulting surface may then be covered with rubber cement in the usual way, the rubber built up on the mandrel and the regular curing process carried through. In the particular case of battery jars, the vulcanized article is found to strip readily from the mandrel, and the film of lubricant left on the vulcanized jar to adhere tightly to the sealing compounds employed in securing the covers in place, since the liquid content of the jar is unable to penetrate the film of the mandrel lubricant and hence to loosen the bond between jar and sealing compound.

Certain water insoluble materials may be mixed with any of the waxes herein above mentioned to form a less expensive lubricant, which will nevertheless be satisfactory. We have found that 2 parts of pitch, 1 part of wax, and 60 parts of organic solvent, or substantially a 5% solution, may be employed in place of the solution of Montan wax with good results. Various pitches may be used in this admixture. Soft pitches of an asphaltic or bitumen type, however, are best adapted for these mandrel lubricants. With hard rubber containers, we find that Montan wax alone as a lubricant gives a better, smoother surface to vulcanized containers, but that with the pitch-wax mixture, the vulcanized articles slip from the mandrels a trifle easier.

In practice, it is necessary to coat with the wax or the wax-pitch solution only that part of the mandrel upon which the upper portion of the jar is formed, provided the remaining portion of the mandrel is coated with a less expensive lubricant. We find that, where mandrels having cavities for the reception of plate-supporting lugs or ribs are employed, the jar slips somewhat more easily from the mandrel if these lug cavities and contiguous portions of the mandrel are first coated with a soap solution, and then the remainder of the mandrel covered with a wax solution of the character above described.

Where electric leakage tests are made on the jars before vulcanization, a solvent for the wax consisting in whole or in part of carbon tetrachloride should be used in order to prevent fires and explosions during test.

Modifications may be resorted to within the scope of our invention and we do not wholly limit our claims to the exact procedure or ingredients herein described.

We claim:

1. The method of preparing surfaces of members contacting with rubber during vulcanization which consists in coating the surfaces at least in part with a substantially water-insoluble composition comprising a wax resistant to absorption in rubber at temperatures of vulcanization.

2. The method of preparing surfaces of members contacting with rubber during vulcanization which consists in coating the surfaces at least in part with a substantially water-insoluble composition comprising a wax of vegetable origin resistant to absorption in rubber at temperatures of vulcanization.

3. The method of preparing surfaces of members contacting with rubber during vulcanization which consists in coating the surfaces at least in part with a substantially water insoluble composition comprising Montan wax.

4. The method of preparing surfaces of members contacting with rubber during vulcanization which consists in coating the surfaces at least in part with a substantially water-insoluble composition comprising a wax of vegetable origin and a soft pitch of the asphalt type.

5. The method of preparing surfaces of members contacting with rubber during vulcanization which consists in coating the surfaces at least in part with a substantially water-insoluble composition comprising Montan wax and asphaltum pitch.

6. A mold element coated at least in part with a substantially water-insoluble composition comprising a wax resistant to absorption in rubber at temperatures of vulcanization.

7. A mold element coated at least in part with a substantially water-insoluble composition comprising a wax of vegetable origin resistant to absorption in rubber at temperatures of vulcanization.

8. A mold element coated at least in part with a substantially water-insoluble composition comprising Montan wax.

9. A mold element coated at least in part with a substantially water-insoluble composition comprising a wax of vegetable origin and a soft pitch of the asphalt type.

10. A mold element coated at least in part with a substantially water-insoluble composition comprising Montan wax and asphaltum pitch.

11. A non-adherent coating for surfaces contacting with rubber during vulcanization consisting of a substantially water-insoluble composition comprising a wax resistant to absorption in rubber at temperatures of vulcanization.

12. A non-adherent coating for surfaces contacting with rubber during vulcanization consisting of a substantially water-insoluble composition comprising a wax of vegetable origin resistant to absorption in rubber at temperatures of vulcanization.

13. A non-adherent coating for surfaces contacting with rubber during vulcanization consisting of a substantially water-insoluble composition comprising Montan wax.

14. A non-adherent coating for surfaces contacting with rubber during vulcanization consisting of a substantially water-insoluble composition comprising a wax of vegetable origin and a soft pitch of the asphalt type.

15. A non-adherent coating for surfaces contacting with rubber during vulcanization consisting of a substantially water-insoluble composition comprising Montan wax and asphaltum pitch.

In witness whereof we have hereunto set our hands this 14th day of November, 1924.

BENTON DALES.
WILLIAM S. CABLE.